D. BELLONI.
RAIL BENDER.
APPLICATION FILED JUNE 2, 1908.

902,470.

Patented Oct. 27, 1908.

WITNESSES
Samuel E. Wade
Edw. W. Byrn.

INVENTOR
DOMENICO BELLONI.
BY Munn & Co.
ATTORNEYS.

UNITED STATES PATENT OFFICE.

DOMENICO BELLONI, OF EDRI, PENNSYLVANIA.

RAIL-BENDER.

No. 902,470.  Specification of Letters Patent.  Patented Oct. 27, 1908.

Application filed June 2, 1908. Serial No. 436,219.

*To all whom it may concern:*

Be it known that I, DOMENICO BELLONI, a citizen of the United States, and a resident of Edri, in the county of Indiana and State of Pennsylvania, have made certain new and useful Improvements in Rail-Benders, of which the following is a specification.

My invention relates to an improvement in rail benders designed for bending the rails of railroad tracks to the necessary curves or for straightening the same. It belongs to that class of rail benders in which a bowed yoke having hook shaped ends is provided in the middle with a screw threaded enlargement adapted to receive, and combined with, a screw stem passing through said threaded enlargement and adapted to bear against the rail at a point midway between the hooks of the bowed yoke.

My invention consists in the novel construction and arrangement of the parts of a screw stem whereby motion may be imparted to the same in either direction and the motion of the screw quickly and conveniently reversed at will. The construction of the said parts is designed with reference to great strength and durability as well as ease and convenience of manipulation.

Figure 1:
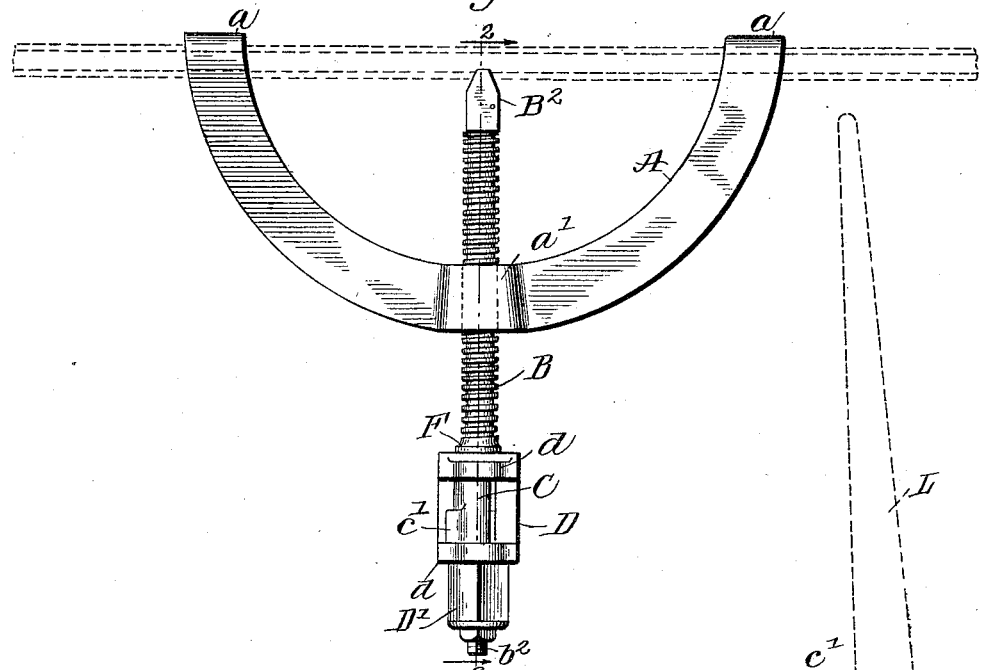
Figure 2:
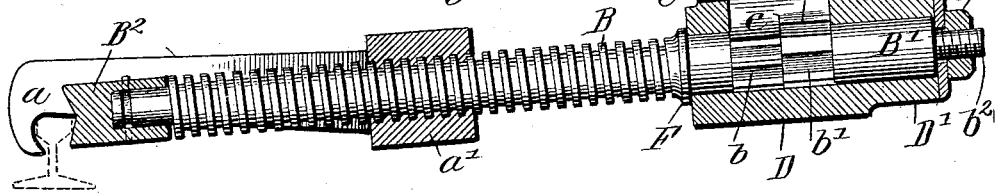
Figure 3:
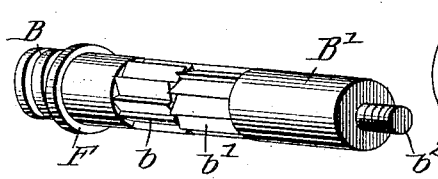
Figure 4:
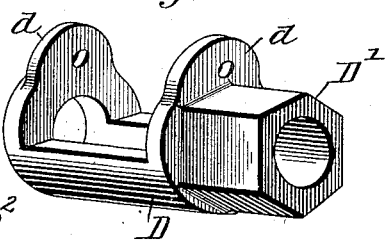
Figure 5:
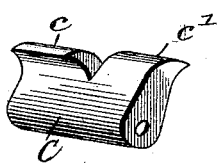

Figure 1 is a plan view of my rail bender shown applied to a rail indicated in dotted lines. Fig. 2 is a section on line 2—2 of Fig. 1 shown on a larger scale with the turning lever indicated in dotted lines. Fig. 3 is a perspective view of the outer end of the screw stem. Fig. 4 is a detail perspective of the oscillating pawl frame, and Fig. 5 is a detail in perspective of the pawl.

In the drawing, A represents a semicircular yoke whose ends are provided with hooks $a$ $a$ adapted to hook over the top of the rail, as seen in Figs. 1 and 2. The middle part of the yoke A is provided with an enlargement $a'$, screw threaded interiorly to receive a stout screw stem B. This screw stem is provided on its end next to the rail with a swiveling seat $B^2$ notched at the end to receive the rail as seen in Fig. 2.

As so far described, the rail bender is of the usual construction. In carrying out my invention I construct the outer portion of the screw stem B with an extension B', in which are formed two series of ratchet teeth $b$ and $b'$, which two series of teeth trend or point in opposite directions. Hung upon the portion B' between a fixed collar F and a washer G is arranged an oscillatory pawl carrier D, seen in detail in Fig. 4. This pawl carrier consists of a semicircular portion having two perforated ears $d$ $d$ and a polygonal extension D' which may be either hexagonal as shown, or square, or any other form adapted to coöperate with a wrench, a spanner, or an operating lever handle. Between the two ears $d$ $d$ of the pawl carrier is pivotally hung the double acting pawl C connected to the ears by means of the pintle pin $e$. This double acting pawl is provided at one end with a detent tooth $c$ pointing in one direction and at the other end with another detent tooth $c'$ pointing in the other direction. These two detent teeth are arranged in the planes respectively of the two series of ratchet teeth $b$ and $b'$ on the extension B' of the screw stem. On the end of the screw stem extension B' is formed a reduced screw threaded end $b^2$ adapted to receive a nut H on the outside of the washer G, which in connection with the fixed collar F on the screw stem, holds the pawl carrier on the extension B' but allows the pawl carrier to oscillate freely in response to a wrench or lever handle, seen at L in dotted lines, applied to the hexagonal extension B' of the pawl carrier.

When the detent tooth $c$ is in coactive relation with the ratchet teeth $b$ and the lever handle L is oscillated about the axial line of the screw stem, the action of the detent $c$ will be to intermittently turn the screw stem B in one direction. When the pawl is thrown over so as to remove its detent tooth $c$ from the ratchet teeth $b$ and bring its oppositely facing detent tooth $c'$ into engagement with the oppositely facing ratchet teeth $b'$, then the same oscillation of the lever handle will cause a reverse rotary motion to be imparted to the screw stem B.

The shifting of the pawl C upon its pivotal axis $e$ is quickly and conveniently effected and by having detent teeth $c$ and $c'$ arranged on opposite ends of the pawl C and engaging in different planes with two separate series of ratchet teeth $b$ and $b'$, I am enabled to get a very positive and strong clutch action with the minimum effect of wear on the teeth and the most perfect and certain engagement of the teeth in the heavy bending strain. This construction supplies a very strong and durable means for rotating the screw stem without the use of springs, and is of a simple, cheap and practical construction.

My bending device may be arranged to either push or pull in exerting the strain and may be applied to bending metal bars of any form and for any purpose.

I claim—

1. In a metal bending machine, the combination with a screw stem having two series of oppositely pointing ratchet teeth, an oscillating pawl carrier swiveling thereon, having at the end an integral polygonal extension, a double toothed pawl pivoted on the carrier, and having at opposite ends oppositely pointing detent teeth arranged to operate in different planes.

2. In a metal bending machine, the combination with a screw stem having two series of oppositely pointing ratchet teeth, an oscillating pawl carrier swiveling thereon and of semicylindrical form provided with offsetting ears, and an integral polygonal extension at the end, and a double toothed pawl pivoted between the ears and having at opposite ends oppositely pointing detent teeth arranged to operate in different planes.

3. A metal bending machine comprising a yoke having hooks at the ends thereof and an enlarged screw threaded middle part, a screw stem meshing therewith and having upon one end a swiveling seat and at the other end being formed with a smooth extension provided with two series of oppositely facing ratchet teeth, a fixed collar at one end of the smooth extension and a reduced screw stem at the other end provided with a nut, an oscillatory pawl carrier freely turning upon the extension of the screw stem and having a double acting pawl provided with oppositely facing detent teeth arranged in separate planes to act respectively upon the two series of oppositely facing ratchet teeth.

DOMENICO BELLONI.

Witnesses:
J. C. MOORE,
J. S. PIERCE.